April 26, 1938.                K. CLARK                2,115,518
                            CONTROL DEVICE
                        Filed Feb. 17, 1937          2 Sheets-Sheet 1

INVENTOR.
KENDALL CLARK
BY McConkey & Booth
ATTORNEYS.

April 26, 1938.  K. CLARK  2,115,518
CONTROL DEVICE
Filed Feb. 17, 1937  2 Sheets-Sheet 2
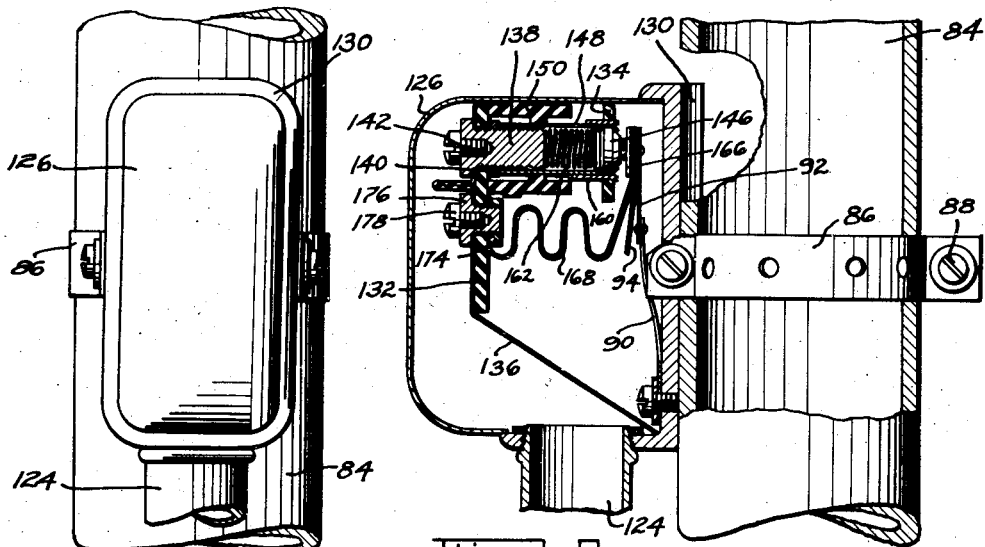
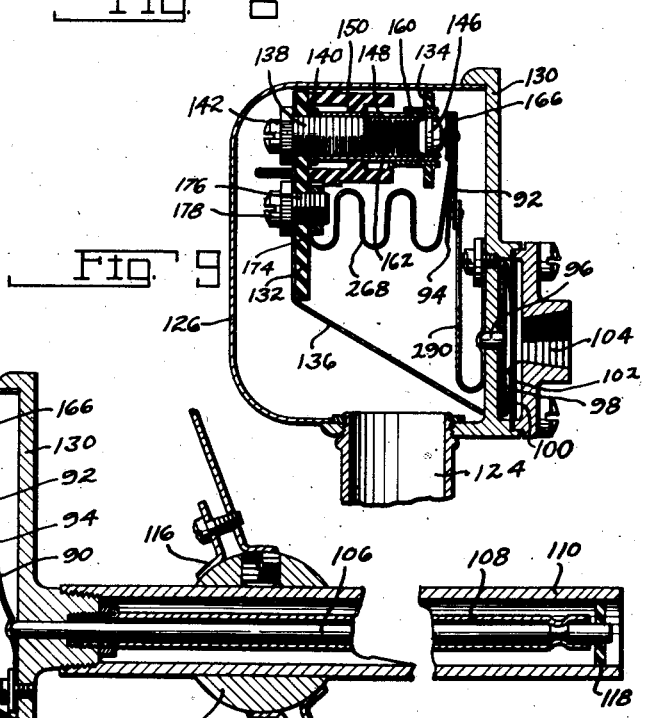
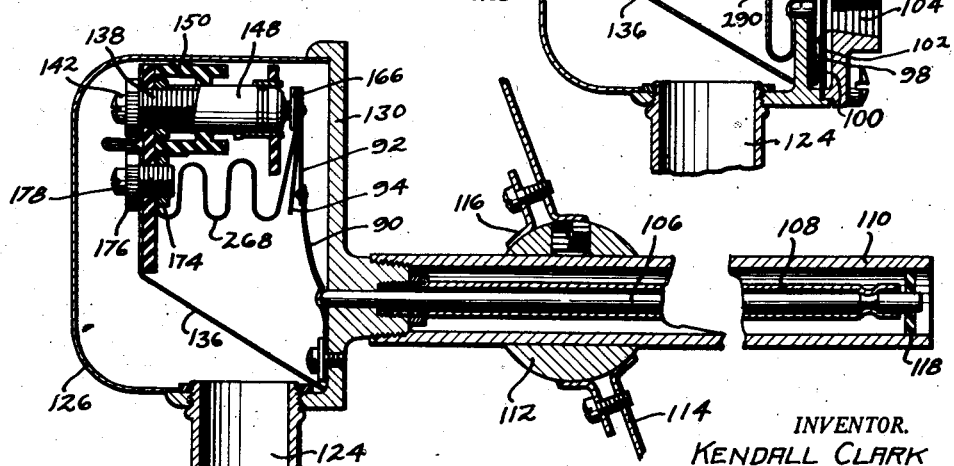
INVENTOR.
KENDALL CLARK
BY McConkey & Booth
ATTORNEYS.

Patented Apr. 26, 1938

2,115,518

UNITED STATES PATENT OFFICE 2,115,518

CONTROL DEVICE

Kendall Clark, South Bend, Ind., assignor to International Engineering Corporation, Chicago, Ill., a corporation of Illinois Application February 17, 1937, Serial No. 126,121

17 Claims. (Cl. 200—138)

This invention relates to control devices such as switches, and is illustrated as embodied in automatic switches used to control a heating system.

An object of the invention is to provide a simple and reliable control switch or the like having a snap action, and which is preferably provided with magnetic means to provide such a snap action. Various features of novelty relate to the arrangement of the magnet and a flat spring carrying the magnet armature, and which is preferably either itself a thermostat or controlled by a thermostat or a pressure device or other automatic means, and to the arrangement of the magnet and its associated parts to facilitate adjusting the air gap of the magnet, preferably by shifting the pole piece of the magnet.

The above and other objects and features of the invention, including various novel combinations of parts and desirable particular constructions and arrangements, will be apparent from the following description of the illustrative arrangements shown in the accompanying drawings, in which:

Figure 7 is an elevation of a modification of my invention adapted to serve as a temperative controlled safety limit switch for hot water heating systems;

Figure 8 is a front elevation of the device of Figure 7;

Figure 9 is a vertical section of an embodiment intended for use as a pressure-controlled safety limit switch for steam heating systems; and Figure 10 is a vertical section of another thermostatically controlled embodiment, adapted for use as a temperature controlled safety limit switch for a hot air heating system.

Figure 1:
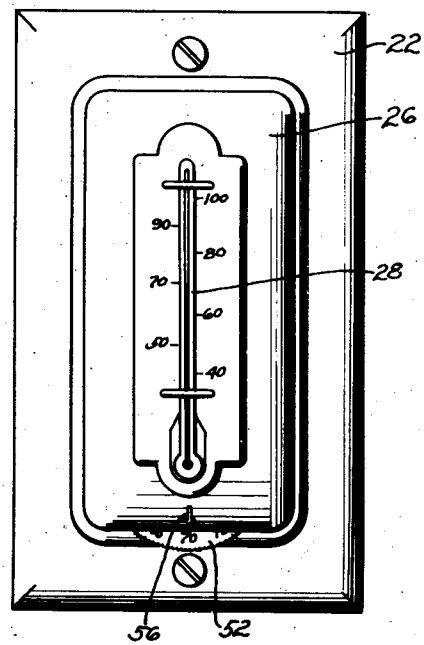
Figure 1 is a front elevation of an embodiment of my invention adapted to serve as a room thermostat to control a furnace.
Figure 2:
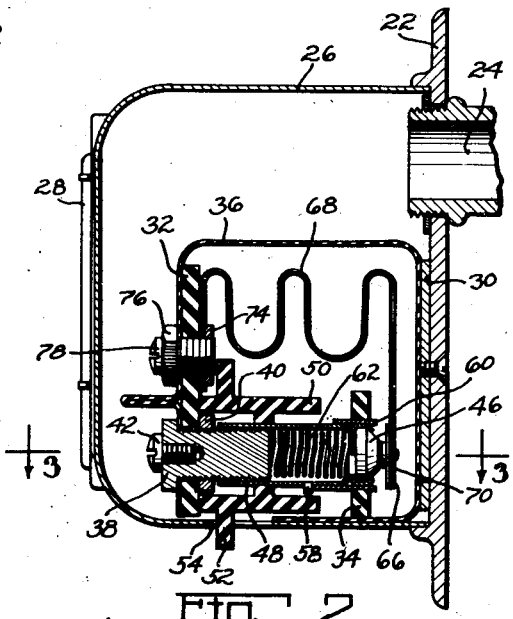
Figure 2 is a central vertical section therethrough.
Figure 3:
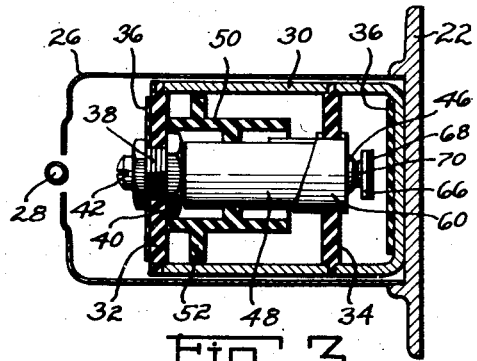
Figure 3 is a horizontal section therethrough, on the line 3—3 of Figure 2.
Figure 6:
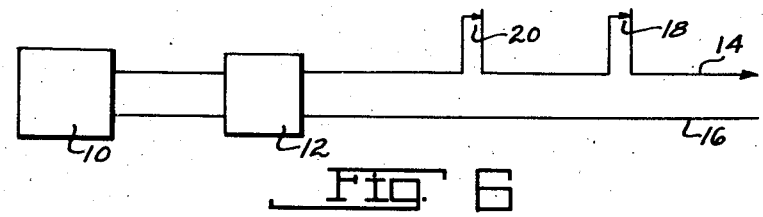
Figure 6 is a diagram of an oil burner circuit including the control device of Figures 1–3.

The embodiment of Figures 1–3 is intended for use as the room thermostat of an oil burner system. For example an oil burner 10 (Figure 6) and its control 12 may be connected in series between line wires 14 and 16 with such a room thermostat switch, indicated at 18, and one or more safety limit switches 20, which may be of the form hereinafter described.

The illustrated room thermostat switch includes a vertical base 22, adapted to be secured to a wall and having a conduit 24 for the lead-in wires. A suitable removable cover 26 may, if desired, have a thermometer 28 mounted thereon. The base 22 has mounted thereon a U-shaped support 30, between the arms of which are mounted plates or brackets 32 and 34 of insulating material. These brackets carry the operating parts described below, and which may be inclosed in a strip 36 of insulating material.

A large screw 38 is formed with a head engaging one side of the support 32, and is externally threaded to receive a clamp nut 40 engaging the other side of the support; it is provided with a screw 42 in its end which forms a binding post for one of the lead-in wires. The large screw 38 acts as a guide or journal to slidably support a small permanent magnet 46 (preferably made of high permeability alloy) carried by a sleeve 48 carried by the screw 38.

The sleeve 48 has rigidly secured thereto a tube 50 of insulating material, formed with a flange 52 projecting through an opening 54 in the cover 26, and graduated in temperatures to cooperate with a pointer 56 on the cover 26. The sleeve 48 has mounted thereon a cam follower part such as a pin 58 engaging a helical cam surface on the edge of a cylindrical cam member 60, arranged coaxially with respect to the guide 38 and the sleeve 48. A spring 62 compressed between the magnet 46 and the guide 38, holds the follower 58 yieldingly against the cam 60 and, as the spring is preferably edge-wound of flat stock, provides good electrical conductivity between the large screw 38 and the magnet 46.

Figures 4, 5:
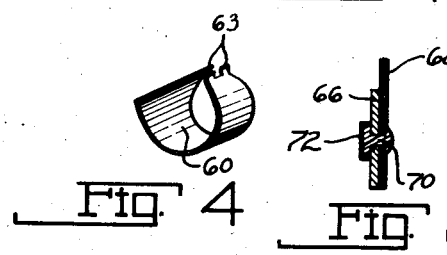
Figure 4 is a perspective view of a cam member used in adjusting the device of Figures 1–3.
Figure 5 is an enlarged section through the end of the thermostatic spring and the magnet armature carried thereby.

To provide for calibration, I preferably form the cam 60 (as shown in Figure 4) as a split sleeve seated in an opening in the bracket 34 and having lugs 63 embracing the bracket between them. The wall of the opening in the bracket 34 may be serrated, for interlocking engagement with a sharp edge turned outwardly on the cam 60 between the lugs 63. Thus in calibrating the instrument, the sleeve may be compressed with the fingers and rotated, and when released it expands and grips the bracket 34.

The armature of the magnet is shown as a soft iron plate 66, secured to the end of a looped flat spring 68 by a steel rivet 70 having a plating 72 of silver or the like, and the plated head of which engages the magnet 46 when the circuit is closed.

The spring 68 in this case is bi-metallic, and forms the thermostatic element of the switch. It preferably has two or more loops, and is fixedly held on the bracket 32 by a nut 74 threaded on a bolt 76 passing through the bracket, and the head of which carries a binding post 78 for the other lead-in wire.

Assuming that the armature is away from the magnet, and that the temperature in the room gradually falls to the temperature for which the device is set, as indicated by the scale on the flange 52, the lowering of the temperature flexes the bimetallic spring 68, until the gap between the armature and magnet 46 becomes small enough for the pull of the magnet to overcome the resistance of the spring 68, whereupon the armature suddenly snaps into engagement with the magnet, thus closing the circuit.

As the temperature rises, the spring 68 exerts more and more tension on the armature, in a direction to open the circuit, until when it overbalances the pull of the magnet the armature suddenly snaps to open position. The snap action in opening and closing depends on the fact that the pull of the magnet increases rapidly as the air gap is diminished, and decreases rapidly as the air gap is increased, so that at some critical point in both opening and closing the magnet will either suddenly close its circuit with the armature, or will suddenly release the armature.

As previously mentioned, the device may be calibrated at the factory by turning the cam 60 about its axis.

The device shown in Figures 7 and 8 is adapted for use as a safety limit switch for a heating system enclosing hot water as a circulating medium, although it may be used wherever a circuit is to be opened or closed as a predetermined temperature is reached in a conduit or the like. The illustrated switch is intended for use as the switch 20 in Figure 6 and serves to open the circuit when the circulating hot water in a pipe 84 exceeds a predetermined safe limit, and, of course, to close the circuit when the temperature falls below that limit after the burner stops. The various parts which are the same as, or very closely similar to, those in Figures 1–3 are indicated by the same reference characters increased by 100. It is believed that the operation of these parts will be apparent without extended description.

The base 130 in this case is curved to fit closely against the pipe 84, or the equivalent part whose temperature is to control the device, to which it is secured by a clamp such as metal straps 86 drawn together by a bolt 88. As the thermostatic element 168 in this case must be quite sensitive, its free end (with the magnet armature) is supported by a vertical flat spring 90 fixed to the base 130 at its lower end. The flat spring 90 is attached to the armature through a section 92 of insulating material, to avoid possible grounding of the circuit on the conduit 84, and a strip 94 of insulating material may be interposed between the bimetallic element 168 and the spring 90.

The snap action in opening and closing the switch, under the control of the bimetallic element 168 as it is affected by the temperature, is as previously described.

In Figure 9 the device is shown modified to be controlled by pressure, for example as a boiler-controlled safety limit switch. Most of the parts are the same as in Figure 8, and are indicated by the same reference characters. However, the spring 268 is a simple flexible flat spring, and is not bimetallic like spring 168. The spring 290 is looped around at its lower end, instead of being straight like the spring 90, and has a depression to receive the rounded end of a thrust plunger 96 passing through the base 130 and having a mushroom head 98 which backs up a diaphragm 100 in a chamber 102 having an inlet 104 adapted to be connected to the space whose pressure is to control the switch.

In this case the controlling pressure acts through the plunger 96 to bend the spring 290 near the point at which it is secured to the base 130 thereby tending to swing the contact end of the spring 290 toward the base and away from the magnet 146 to break the circuit as the spring force overcomes the magnetic force. When the pressure decreases the contact end swings back until it comes within the magnetic field sufficiently to be snapped back into contact.

The construction of Figure 10 is the same as that in Figure 8, except that instead of using the spring 168 of bimetallic thermostat material, it is a simple flat spring 268 as in Figure 9, the thermostatic action being due to engagement with the spring 90 of a thrust rod or plunger 106 (preferably of brass) secured at its outer end to a tube 108 of dissimilar metal, i. e. a metal having a different coefficient of expansion (preferably invar). This modification is adapted to be used as a safety limit switch in a hot air heating system to prevent overheating the furnace by opening the burner control circuit when the circulating air from the heater exceeds a predetermined safe limit.

The rod 106 and tube 108 are inclosed in a tubular housing 110 adjustably held by a ball 112 mounted in a socket formed half in the wall of the hot air pipe or conduit 114 and half in a stamping 116 attached thereto. The tubes 108 and 110 are shown threadedly connected to a boss on the base 130, and the plunger 106 slides through a bearing in this boss at one end and is slidably supported at its other end by a washer 118 of nonmetallic material which is seated in the end of the tube 110.

If the switch is to open on a rise in temperature as required for safety limit control, tube 108 has a greater coefficient of expansion than plunger 106; the reverse is true if the switch is to close on a rise in temperature.

While several illustrative embodiments have been described in detail, it is not my intention to limit the scope of my invention to those particular embodiments, or otherwise than by the terms of the appended claims.

I claim:

1. A switch comprising a guide, a movable magnet, a sleeve surrounding the guide and carrying the magnet, a contact yieldingly urged away from the magnet and having associated therewith an armature attracted by the magnet, and means operated by turning the sleeve on the guide for shifting the magnet to vary the gap between the magnet and said armature.

2. A switch comprising a guide, a movable magnet, a sleeve surrounding the guide and carrying the magnet, a contact having associated therewith an armature attracted by the magnet, a spring carrying the contact and armature and urging them away from the magnet and having associated therewith means for bending the spring toward the magnet until its attraction for the armature overcomes the resistance of the spring, and means operated by turning the sleeve on the guide for shifting the magnet to vary the gap between the magnet and said armature.

3. A switch comprising a guide, a movable magnet, a sleeve surrounding the guide and carrying the magnet, a contact yieldingly urged away from the magnet and having associated therewith an armature attracted by the magnet, a stationary cam member coaxial with respect to the magnet and having a generally helical cam surface, and a follower part carried by the sleeve and engaging the cam surface.

4. A switch comprising a guide, a movable magnet, a sleeve surrounding the guide and carrying the magnet, a contact having associated therewith an armature attracted by the magnet, a spring carrying the contact and armature and urging them away from the magnet and having associated therewith means for bending the spring toward the magnet until its attraction for the armature overcomes the resistance of the spring, a stationary cam member coaxial with respect to the magnet and having a generally helical cam surface, and a follower part carried by the sleeve and engaging the cam surface.

5. A switch comprising a guide, a movable magnet, a sleeve surrounding the guide and carrying the magnet, a contact yieldingly urged away from the magnet and having associated therewith an armature attracted by the magnet, a stationary cam member coaxial with respect to the magnet and having a generally helical cam surface, a follower part carried by the sleeve and engaging the cam surface, and a spring compressed between the guide and the magnet and urging said part against the cam surface.

6. A switch comprising a guide, a movable magnet, a sleeve surrounding the guide and carrying the magnet, a contact having associated therewith an armature attracted by the magnet, a spring carrying the contact and armature and urging them away from the magnet and having associated therewith means for bending the spring toward the magnet until its attraction for the armature overcomes the resistance of the spring, a stationary cam member coaxial with respect to the magnet and having a generally helical cam surface, a follower part carried by the sleeve and engaging the cam surface, and a spring compressed between the guide and the magnet and urging said part against the cam surface.

7. A switch comprising a guide, a movable magnet, a sleeve surrounding the guide and carrying the magnet, a contact yieldingly urged away from the magnet and having associated therewith an armature attracted by the magnet, a stationary cam member coaxial with respect to the magnet and having a generally helical cam surface, and a follower part carried by the sleeve and engaging the cam surface, said cam member having a mounting permitting it to be turned about its axis to adjust the position of the cam surface.

8. A switch comprising a guide, a movable magnet, a sleeve surrounding the guide and carrying the magnet, a contact having associated therewith an armature attracted by the magnet, a spring carrying the contact and armature and urging them away from the magnet and having associated therewith means for bending the spring toward the magnet until its attraction for the armature overcomes the resistance of the spring, a stationary cam member coaxial with respect to the magnet and having a generally helical cam surface, a follower part carried by the sleeve and engaging the cam surface, said cam member having a mounting permitting it to be turned about its axis to adjust the position of the cam surface.

9. A magnet assembly for a switch or the like comprising a magnet yieldingly urged in one direction and having attached thereto a member having a cam-engaging part, and a stationary cam engaged by said part and determining the position of the magnet.

10. A magnet assembly for a switch or the like comprising a magnet yieldingly urged in one direction and having attached thereto a rotatable member carrying a cam-engaging part, and a stationary cam having a helical cam surface engaged by said part and determining the position of the magnet.

11. A magnet assembly for a switch or the like comprising a magnet yieldingly urged in one direction and having attached thereto a rotatable member carrying a cam-engaging part, a stationary cam having a helical cam surface engaged by said part and determining the position of the magnet, and a support in which the cam is rotatably mounted to permit adjustment.

12. A magnet assembly for a switch or the like comprising a magnet yieldingly urged in one direction and having attached thereto a rotatable member carrying a cam-engaging part, a bracket having an opening coaxial with respect to said member, and a cylindrical cam having one edge formed as a helical surface engaged by said part and which is seated in said opening for angular adjustment therein and which has means engaging the bracket and holding the cam in adjusted position.

13. A magnet assembly for a switch or the like comprising a magnet yieldingly urged in one direction and having attached thereto a rotatable member carrying a cam-engaging part, a bracket having an opening coaxial with respect to said member, and a cylindrical cam having one edge formed as a helical surface engaged by said part and which is seated in said opening for angular adjustment therein and which has a tooth engaging and interlocking with the opening wall and holding the cam in adjusted position.

14. A switch comprising a support, a guide mounted at one end on the support and projecting therefrom and which has movably mounted thereon a permanent magnet, means sleeved about the guide and movable about its axis to adjust the magnet, a bi-metallic thermostat formed as a looped flat spring and which is mounted at one end on the support and which carries at its other end an armature opposite the magnet, and electrical connections to the magnet and the thermostat respectively.

15. A switch comprising a support which has mounted thereon a permanent magnet, a bi-metallic thermostat formed as a looped flat spring and which is mounted at one end on the support and which carries at its other end an armature opposite the magnet, and electrical connections to the magnet and the thermostat respectively.

16. A switch comprising a support, a guide mounted at one end on the support and projecting therefrom and which has movably mounted thereon a permanent magnet, means sleeved about the guide and movable about its axis to adjust the magnet, a looped flat spring mounted at one end on the support and having at its other end an armature cooperating with the magnet, an electric circuit opened and closed by movements of the armature, another flat spring secured to the armature at one end and fixed at its opposite end, and control means acting on said other spring.

17. A switch comprising a support, a guide mounted at one end on the support and projecting therefrom and which has movably mounted thereon a permanent magnet, a looped flat spring mounted at one end on the support and having at its other end an armature cooperating with the magnet, an electric circuit opened and closed by movements of the armature, another flat spring secured to the armature at one end and fixed at its opposite end, and a pressure device acting on said other spring.

KENDALL CLARK.